US011408116B2

(12) United States Patent
Dunn et al.

(10) Patent No.: US 11,408,116 B2
(45) Date of Patent: Aug. 9, 2022

(54) DRYER APPLIANCES AND VENTING METHODS FOR DRYER APPLIANCES

(71) Applicant: Haier US Appliance Solutions, Inc., Wilmington, DE (US)

(72) Inventors: David Scott Dunn, Smithfield, KY (US); James Quentin Pollett, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 211 days.

(21) Appl. No.: 16/135,065

(22) Filed: Sep. 19, 2018

(65) Prior Publication Data

US 2020/0087845 A1    Mar. 19, 2020

(51) Int. Cl.
*D06F 58/30*  (2020.01)
*D06F 58/24*  (2006.01)
*D06F 58/20*  (2006.01)
*D06F 58/38*  (2020.01)
*D06F 103/08* (2020.01)

(52) U.S. Cl.
CPC ............ *D06F 58/30* (2020.02); *D06F 58/206* (2013.01); *D06F 58/24* (2013.01); *D06F 58/38* (2020.02); *D06F 2103/08* (2020.02)

(58) Field of Classification Search
CPC ........ D06F 58/30; D06F 58/24; D06F 58/206; D06F 58/38; D06F 2103/08; D06F 2103/00; D06F 2105/32; D06F 2105/00; D06F 58/48; D06F 58/36; Y02B 40/00
See application file for complete search history.

(56) References Cited

U.S. PATENT DOCUMENTS

| 4,388,766 A   | * | 6/1983  | Sanderson ............. D06F 58/20 |
|               |   |         |                           137/865 |
| 8,978,267 B2  |   | 3/2015  | Krausch et al.                    |
| 9,785,155 B2  | * | 10/2017 | Rhee ..................... H04W 24/00 |
| 2014/0368353 A1 | * | 12/2014 | Forbes, Jr. ............. G01D 4/002 |
|               |   |         |                         340/870.02 |
| 2015/0254970 A1 | * | 9/2015  | Sloo ....................... G01N 27/02 |
|               |   |         |                            340/506 |

FOREIGN PATENT DOCUMENTS

| CN | 101235587 B   | 8/2011 |
| EP | 2599912 A1    | 6/2013 |

* cited by examiner

*Primary Examiner* — Jessica Yuen
(74) *Attorney, Agent, or Firm* — Dority & Manning, P.A.

(57) ABSTRACT

A method of operating a dryer appliance includes directing a flow of hot dry air into a chamber defined within a drum of the dryer appliance. The method also includes receiving a signal indicative of an atmospheric condition external to the dryer appliance and determining whether the indicated atmospheric condition is less than a threshold. The method may further include directing a flow of air from the chamber to an interior space when the indicated atmospheric condition external to the dryer is less than the threshold, and activating a component of an environmental control system in communication with the interior space when the indicated atmospheric condition of the ambient environment external to the dryer is less than the threshold.

14 Claims, 5 Drawing Sheets

DRYER APPLIANCES AND VENTING METHODS FOR DRYER APPLIANCES

FIELD OF THE INVENTION

The present subject matter relates generally to dryer appliances, such as condensation dryer appliances, and to methods for venting such appliances based on external atmospheric conditions.

BACKGROUND OF THE INVENTION

A conventional appliance for drying articles such as a clothes dryer (or laundry dryer) for drying clothing articles typically includes a cabinet having a rotating drum for tumbling clothes and laundry articles therein. One or more heating elements heat air prior to the air entering the drum, and the warm air is circulated through the drum as the clothes are tumbled to remove moisture from laundry articles in the drum. Gas or electric heating elements may be used to heat the air that is circulated through the drum.

In a known operation, ambient air from outside the appliance is drawn into the cabinet and passed through the heater before being fed to the drum. Moisture from the clothing is transferred to the air passing through the drum. Typically, this moisture laden air is then transported away from the dryer by, for example, a duct leading outside of the structure or room where the dryer is placed. The exhausted air removes moisture from the dryer and the clothes are dried as the process is continued by drawing in more ambient air.

Unfortunately, for the conventional dryer described above, the exhausted air is still relatively warm while the ambient air drawn into the dryer must be heated. This process is relatively inefficient because heat energy in the exhausted air is lost and additional energy must be provided to heat more ambient air. More specifically, the ambient air drawn into the dryer is heated to promote the liberation of the moisture out of the laundry. This air, containing moisture from the laundry, is then exhausted into the environment along with much of the heat energy that was used to raise its temperature from ambient conditions.

One alternative to a conventional dryer as described above is a heat pump dryer. More specifically, a heat pump dryer uses a refrigerant cycle to both provide hot air to the dryer and to condense water vapor in air coming from the dryer. Since the moisture content in the air from the dryer is reduced by condensation over the evaporator, this same air can be reheated again using the condenser and then passed through the dryer again to remove more moisture. Moreover, since the air is recycled through the dryer in a closed loop rather than being ejected to the environment, the heat pump dryer can be more efficient to operate than the traditional dryer described above. In addition, the heating source provided by the sealed refrigerant system of a heat pump dryer can be more efficient than a gas or electric heater implemented in the conventional dryer.

During operation of a typical heat pump dryer, the dryer consumes power. The dryer system will heat continuously during operation. If the amount of power consumed is greater than the rate of heat transfer to the surroundings, the system will heat up. Excessive heat can lead to reduced performance and reliability. More particularly, as air circulates, the temperature of the air within the sealed loop increases. Similarly, the thermal load to the sealed refrigerant system increases. Simply put, the excess heat must go somewhere. In some instances, the thermal load may be reduced or offset by venting hot air into the ambient environment around the dryer appliance to dissipate the excess heat, e.g., to the laundry room, via air exchange. However, in some cases, e.g., during warmer months, this may result in undesired increases in ambient temperature within a living space.

Accordingly, a dryer appliance having improved venting of hot air would be advantageous.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, method of operating a dryer appliance is provided. The method includes directing a flow of hot dry air into a chamber defined within a drum of the dryer appliance. The method also includes receiving a signal indicative of an atmospheric condition external to the dryer appliance and determining whether the indicated atmospheric condition external to the dryer appliance is less than a threshold. When the indicated atmospheric condition external to the dryer appliance is less than the threshold, the method includes directing a flow of air from the chamber to an interior space.

In another exemplary aspect of the present disclosure, a method of operating a dryer appliance is provided. The dryer appliance is located in an interior space. The method includes directing a flow of hot dry air into a chamber defined within a drum of the dryer appliance. The method also includes receiving a signal indicative of an atmospheric condition of the interior space and determining whether the indicated atmospheric condition of the interior space is less than a threshold. The method may further include activating a component of an environmental control system in communication with the interior space when the indicated atmospheric condition of the interior space is less than the threshold.

In still another exemplary aspect of the present disclosure, a dryer appliance is provided. The dryer appliance includes a cabinet with a drum rotatably mounted within the cabinet. The drum defines a chamber for the receipt of articles for drying. The dryer appliance also includes a heating system in fluid communication with the chamber and configured to provide a flow of hot dry air to the chamber. A duct is in fluid communication with the chamber and configured to receive moisture-laden heated air from the chamber. The dryer appliance further includes a controller. The controller is configured for receiving a signal indicative of an atmospheric condition external to the dryer appliance and determining whether the indicated atmospheric condition external to the dryer appliance is less than a threshold. When the indicated atmospheric condition external to the dryer appliance is less than the threshold, the controller is configured to direct a flow of air from the duct to an interior space. The controller is further configured to activate a component of an environmental control system in communication with the interior space when the indicated atmospheric condition external to the dryer appliance is less than the threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
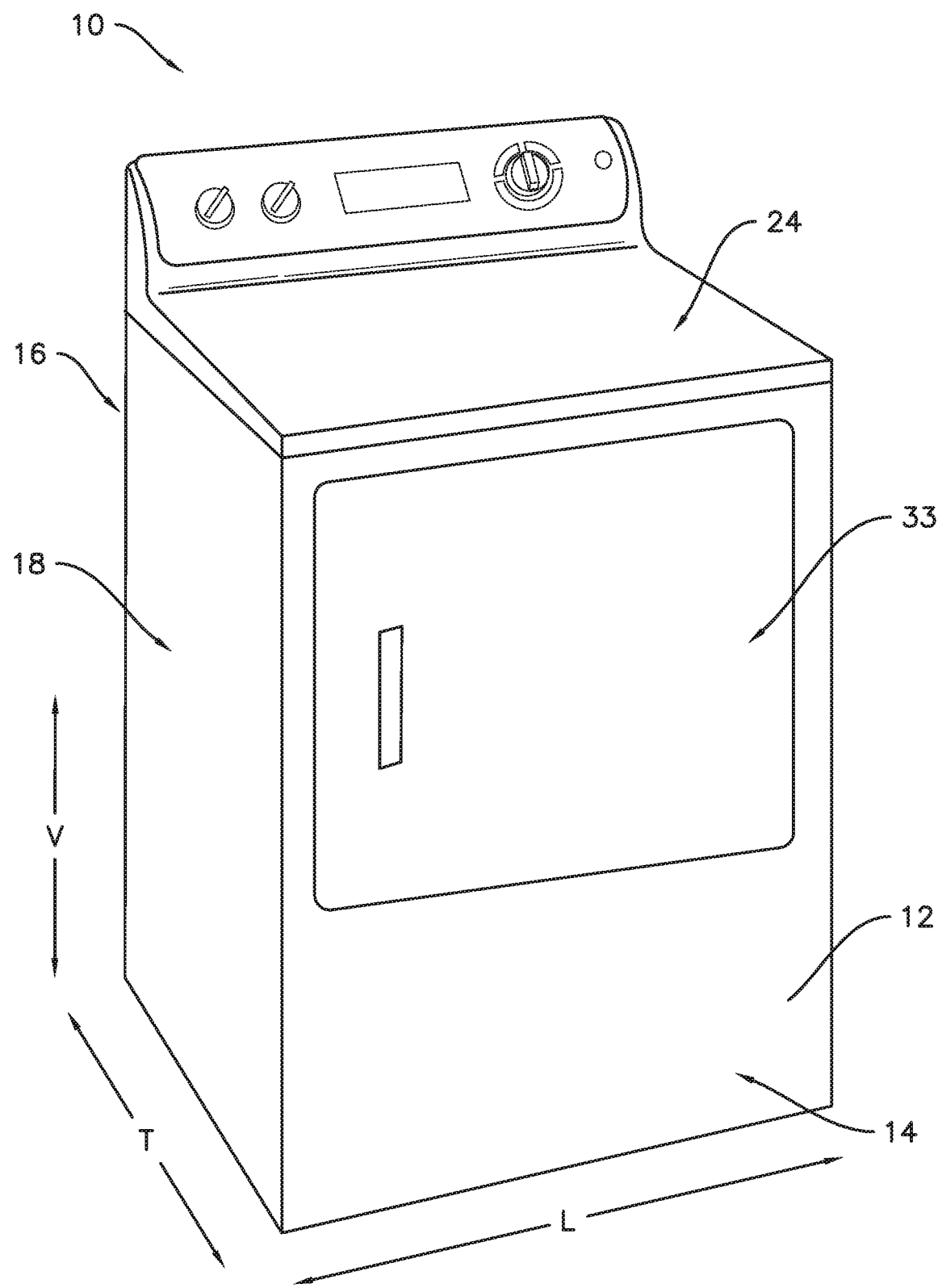
FIG. 1 provides a perspective view of a dryer appliance in accordance with exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
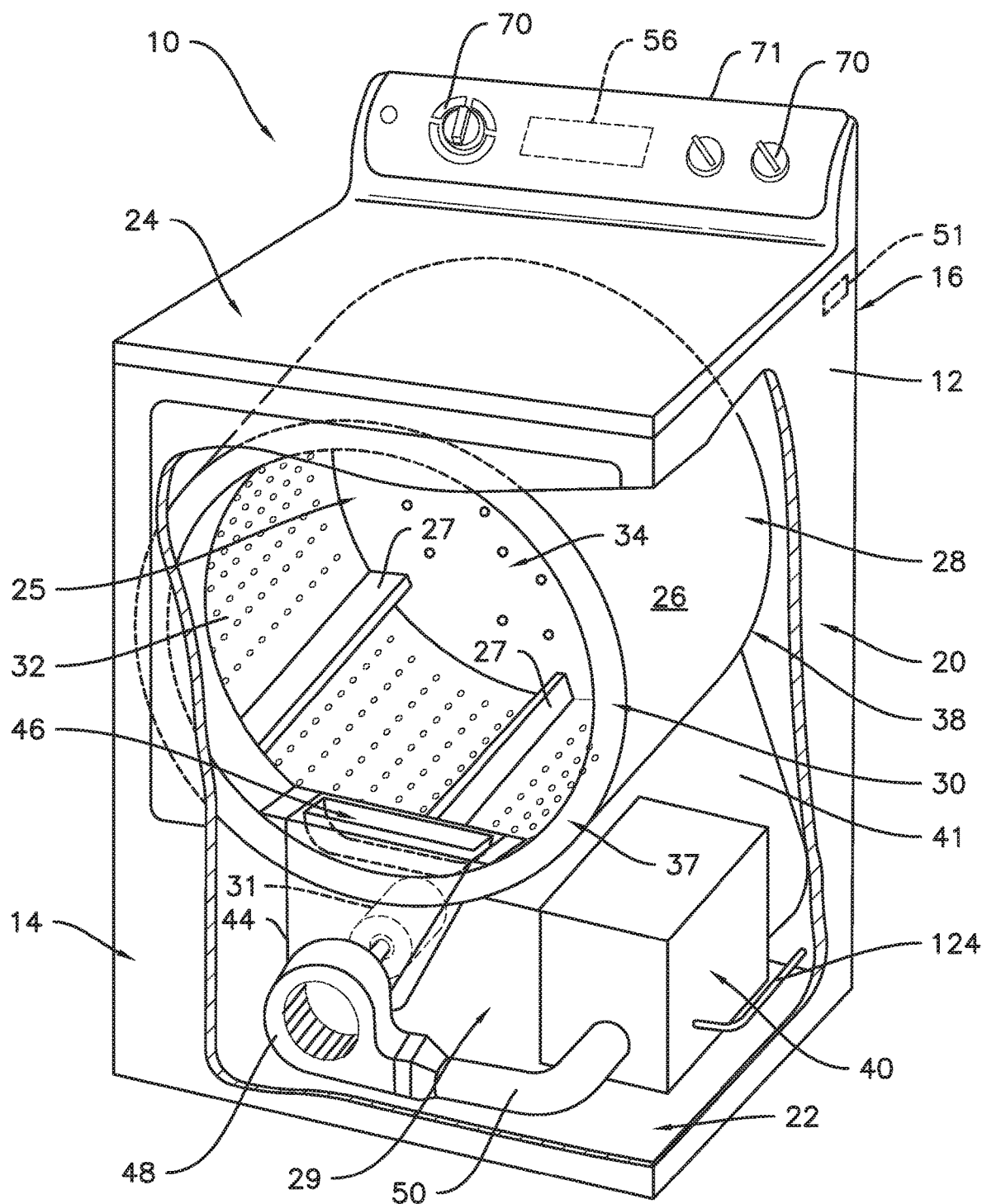
FIG. 2 provides a perspective view of the example dryer appliance of FIG. 1 with portions of a cabinet of the dryer appliance removed to reveal certain components of the dryer appliance.

Turning now to the figures, FIG. 1 provides dryer appliance 10 according to exemplary embodiments of the present disclosure. FIG. 2 provides another perspective view of dryer appliance 10 with a portion of a cabinet or housing 12 of dryer appliance 10 removed in order to show certain components of dryer appliance 10. Dryer appliance 10 generally defines a vertical direction V, a lateral direction L, and a transverse direction T, each of which is mutually perpendicular, such that an orthogonal coordinate system is defined. While described in the context of a specific embodiment of dryer appliance 10, using the teachings disclosed herein, it will be understood that dryer appliance 10 is provided by way of example only. Other dryer appliances having different appearances and different features may also be utilized with the present subject matter as well.

Cabinet 12 includes a front panel 14, a rear panel 16, a pair of side panels 18 and 20 spaced apart from each other by front and rear panels 14 and 16, a bottom panel 22, and a top cover 24. Within cabinet 12, an interior volume 29 is defined. A drum or container 26 is mounted for rotation about a substantially horizontal axis within the interior volume 29. Drum 26 defines a chamber 25 for receipt of articles of clothing for tumbling and/or drying. Drum 26 extends between a front portion 37 and a back portion 38. Drum 26 also includes a back or rear wall 34, e.g., at back portion 38 of drum 26. A supply duct 41 may be mounted to rear wall 34 and receives heated air that has been heated by a heating assembly or system 40.

As used herein, the terms "clothing" or "articles" includes but need not be limited to fabrics, textiles, garments, linens, papers, or other items from which the extraction of moisture is desirable. Furthermore, the term "load" or "laundry load" refers to the combination of clothing that may be washed together in a washing machine or dried together in a dryer appliance 10 (e.g., clothes dryer) and may include a mixture of different or similar articles of clothing of different or similar types and kinds of fabrics, textiles, garments and linens within a particular laundering process.

A motor 31 is provided in some embodiments to rotate drum 26 about the horizontal axis, e.g., via a pulley and a belt (not pictured). Drum 26 is generally cylindrical in shape, having an outer cylindrical wall 28 and a front flange or wall 30 that defines an opening 32 of drum 26, e.g., at front portion 37 of drum 26, for loading and unloading of articles into and out of chamber 25 of drum 26. A plurality of lifters or baffles 27 are provided within chamber 25 of drum 26 to lift articles therein and then allow such articles to tumble back to a bottom of drum 26 as drum 26 rotates. Baffles 27 may be mounted to drum 26 such that baffles 27 rotate with drum 26 during operation of dryer appliance 10.

Drum 26 includes a rear wall 34 rotatably supported within main housing 12 by a suitable fixed bearing. Rear wall 34 can be fixed or can be rotatable. Rear wall 34 may include, for instance, a plurality of holes that receive hot air that has been heated by a heating system 40, e.g., a heat pump or refrigerant-based heating system as will be described further below. Moisture laden, heated air is drawn from drum 26 by an air handler, such as blower fan 48, which generates a negative air pressure within drum 26. The moisture laden heated air passes through a duct 44 enclosing screen filter 46, which traps lint particles. As the air passes from blower fan 48, it enters a duct 50 and then is passed into heating system 40. In some embodiments, the dryer appliance 10 may be a conventional dryer appliance, e.g., the heating system 40 may be or include an electric heating element, e.g., a resistive heating element, or a gas-powered heating element, e.g., a gas burner. In other embodiments, the dryer appliance may be a condensation dryer, such as a heat pump dryer. In such embodiments, heating system 40 may be or include a heat pump including a sealed refrigerant circuit, as described in more detail below with reference to FIG. 3. Heated air (with a lower moisture content than was received from drum 26), exits heating system 40 and returns to drum 26 by duct 41. After the clothing articles have been dried, they are removed from the drum 26 via opening 32. A door 33 provides for closing or accessing drum 26 through opening 32.

In some embodiments, one or more selector inputs 70, such as knobs, buttons, touchscreen interfaces, etc., may be provided or mounted on a cabinet 12 (e.g., on a backsplash 71) and are in operable communication (e.g., electrically coupled or coupled through a wireless network band) with a processing device or controller 56. Controller 56 may also be provided in operable communication with motor 31, blower 48, or heating system 40. In turn, signals generated in controller 56 direct operation of motor 31, blower 48, or heating system 40 in response to the position of inputs 70. As used herein, "processing device" or "controller" may refer to one or more microprocessors, microcontroller, ASICS, or semiconductor devices and is not restricted necessarily to a single element. The controller 56 may be programmed to operate dryer appliance 10 by executing instructions stored in memory (e.g., non-transitory media). The controller 56 may include, or be associated with, one or more memory elements such as RAM, ROM, or electrically erasable, programmable read only memory (EEPROM). For example, the instructions may be software or any set of instructions that when executed by the processing device, cause the processing device to perform operations. It should be noted that controllers as disclosed herein are capable of and may be operable to perform any methods and associated method steps as disclosed herein. For example, in some embodiments, methods disclosed herein may be embodied in programming instructions stored in the memory and executed by the controller.

Also shown in FIG. 2 is a temperature sensor 51. In some embodiments, the dryer appliance 10 may include a sensor, e.g., temperature sensor 51, and which may also or instead sense humidity, onboard the dryer appliance 10. For example, as shown in FIG. 2, the sensor 51 may be located on the cabinet 12 to sense an atmospheric condition, e.g., temperature and/or humidity, external to the dryer appliance 10, e.g., within the interior space where the dryer appliance 10 is located.

Figure 3:
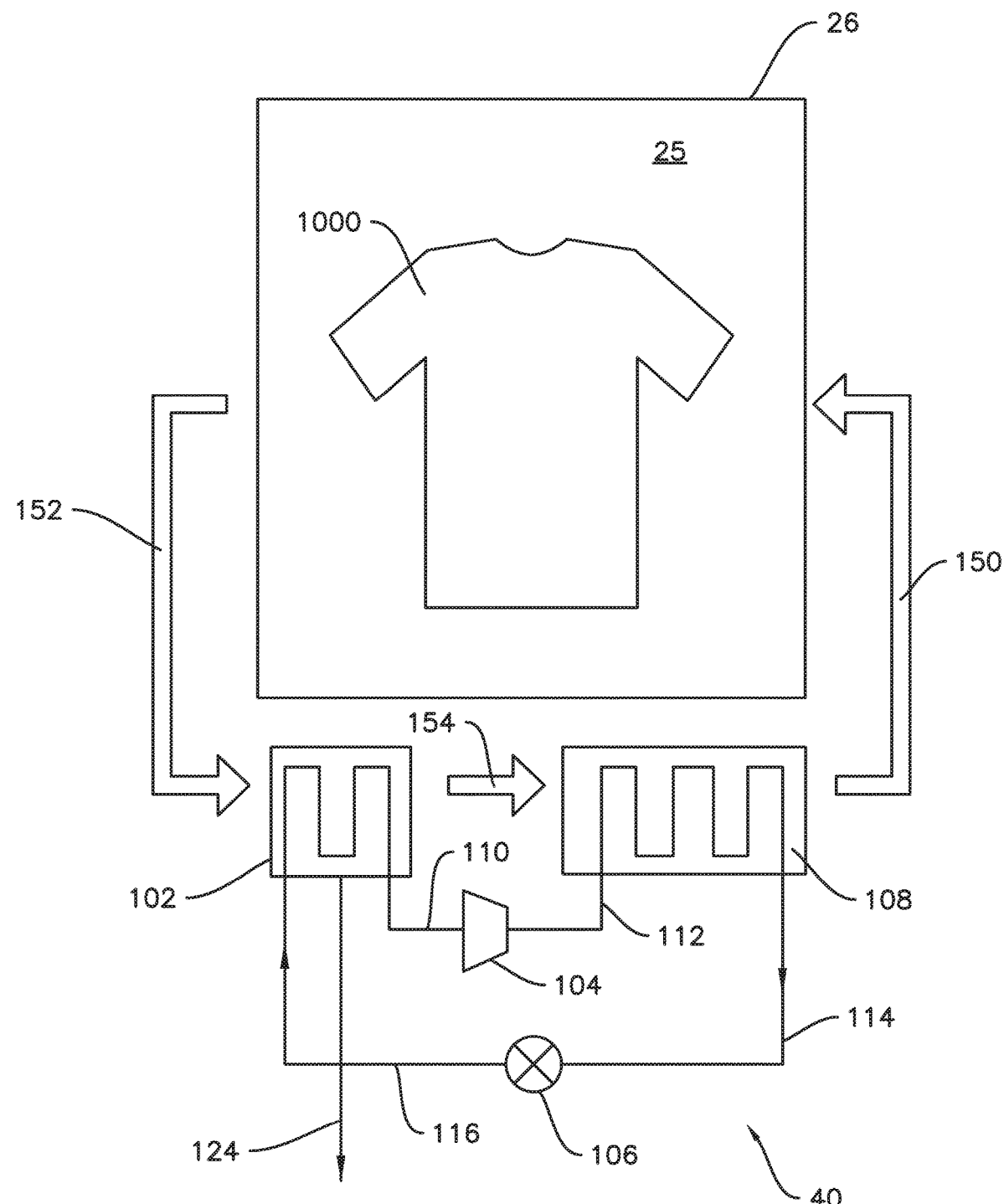
FIG. 3 provides a schematic diagram of an exemplary heat pump dryer appliance according to one or more embodiments of the present disclosure.

Turning now to FIG. 3, a schematic view of exemplary embodiments of dryer appliance 10 is provided. It is understood that, except as otherwise indicated, dryer appliance 10 in FIG. 3 may include some or all of the features described above with respect to FIGS. 1 and 2.

In operation, one or more laundry articles 1000 may be placed within the chamber 25 of drum 26. Hot dry air 150 may be supplied to chamber 25 whereby moisture within laundry articles 1000 may be drawn from the laundry articles 1000 by evaporation, such that warm saturated air 152 may flow from chamber 25 to an evaporator 102 of the heating system 40. As air passes across evaporator 102, the temperature of the air is reduced through heat exchange with refrigerant that is vaporized within, for example, coils or tubing of evaporator 102. This vaporization process absorbs both the sensible and the latent heat from the moisture laden air—thereby reducing its temperature. As a result, moisture in the air is condensed and such condensate may be drained from heating assembly 40, e.g., using line 124 which may also be seen in FIG. 2.

Air passing over evaporator 102 becomes drier and cooler than when it was received from drum 26 of dryer appliance 10. As shown, cool dry air 154 from evaporator 102 is subsequently caused to flow across a condenser 108 (e.g., across coils or tubing), which condenses refrigerant therein. The refrigerant enters condenser 108 in a gaseous state at a relatively high temperature compared to the air 154 from evaporator 102. As a result, heat energy is transferred to the air at the condenser section 108, thereby elevating its temperature and providing warm dry air 150 for resupply to the drum 26 of dryer appliance 10. The warm dry air 150 passes over and around laundry articles 1000 within the chamber 25 of the drum 26, such that warm saturated air 152 is generated, as mentioned above. Because the air is recycled through drum 26 and heating system 40, dryer appliance 10 can have a much greater efficiency than traditional clothes dryers where all of the warm, moisture laden air is always exhausted to the environment.

In other embodiments where the dryer appliance 10 is a condensation dryer, an air-to-air heat exchanger may be provided instead of the evaporator 102 and/or an electric heater may be provided instead of the condenser 102.

As shown, some embodiments of heating system 40 include a compressor 104 that pressurizes refrigerant (i.e., increases the pressure of the refrigerant) supplied by suction line 110 and generally motivates refrigerant through the sealed refrigerant circuit of heating system 40. Compressor 104 may be in operable communication with controller 56 and is generally designed to pressurize a gas phase refrigerant. Accordingly, in order to avoid damage, refrigerant in suction line 110 is supplied to the compressor 104 in a gas phase from the evaporator section 102. The pressurization of the refrigerant with compressor 104 increases the temperature of the refrigerant (e.g., as directed by controller 56). The compressed refrigerant is fed from compressor 104 to condenser 108 through line 112. As relatively cool air from the evaporator 102 is passed over the condenser 108, the refrigerant is cooled and its temperature is lowered as heat is transferred to the air for supply to drum 26.

Upon exiting condenser 108, the refrigerant is fed through line 114 to an expansion device 106. Although only one expansion device 106 is shown, such is by way of example only. It is understood that multiple such devices may be used. In the illustrated example, expansion device 106 is an electronic expansion valve, although a thermal expansion valve or any other suitable expansion device could be used. In additional embodiments, any other suitable expansion device, such as a capillary tube, may be used as well as or instead of the thermal expansion valve 106. Expansion device 106 lowers the pressure of the refrigerant and controls the amount of refrigerant that is allowed to enter the evaporator 102 via line 116. Importantly, the flow of liquid refrigerant into evaporator 102 is limited by expansion device 106 in order to keep the pressure low and allow expansion of the refrigerant back into the gas phase in the evaporator 102. The evaporation of the refrigerant in the evaporator 102 converts the refrigerant from its liquid-dominated phase to a gas phase while cooling and drying the air from drum 26. The process is repeated as air is circulated through drum 26 and between evaporator 102 and condenser 108 while the refrigerant is cycled through the sealed refrigerant circuit, as described above.

In some embodiments, the compressor 104 may be a single-speed compressor. In such embodiments, the rate of heat imparted to the refrigerant by the compressor 104 will remain relatively constant throughout operation of the dryer appliance 10. During operation, and as the process described above is repeated, the moisture content of the articles 1000 decreases. Thus, the capacity of the articles 1000 to absorb heat decreases. In embodiments where the compressor 104 is a single-speed compressor, this may result in excess compressor capacity during the dryer operation, e.g., when the laundry is partially dry but not completely dry. Such excess compressor capacity may result in an increased thermal load, e.g., at the condenser 108 downstream of the compressor 104. In order to reduce the thermal load at the condenser 108 during this portion of the drying operation, the heating system 40, e.g., the condenser 108, may be selectively in thermal communication with an environment external to the dryer appliance 10. The environment external to the dryer appliance 10 may be, e.g., an interior space such as the room in which the dryer appliance 10 is located and/or adjacent interior spaces, or an outdoor space external to, e.g., outside of, the interior space.

Figure 4:
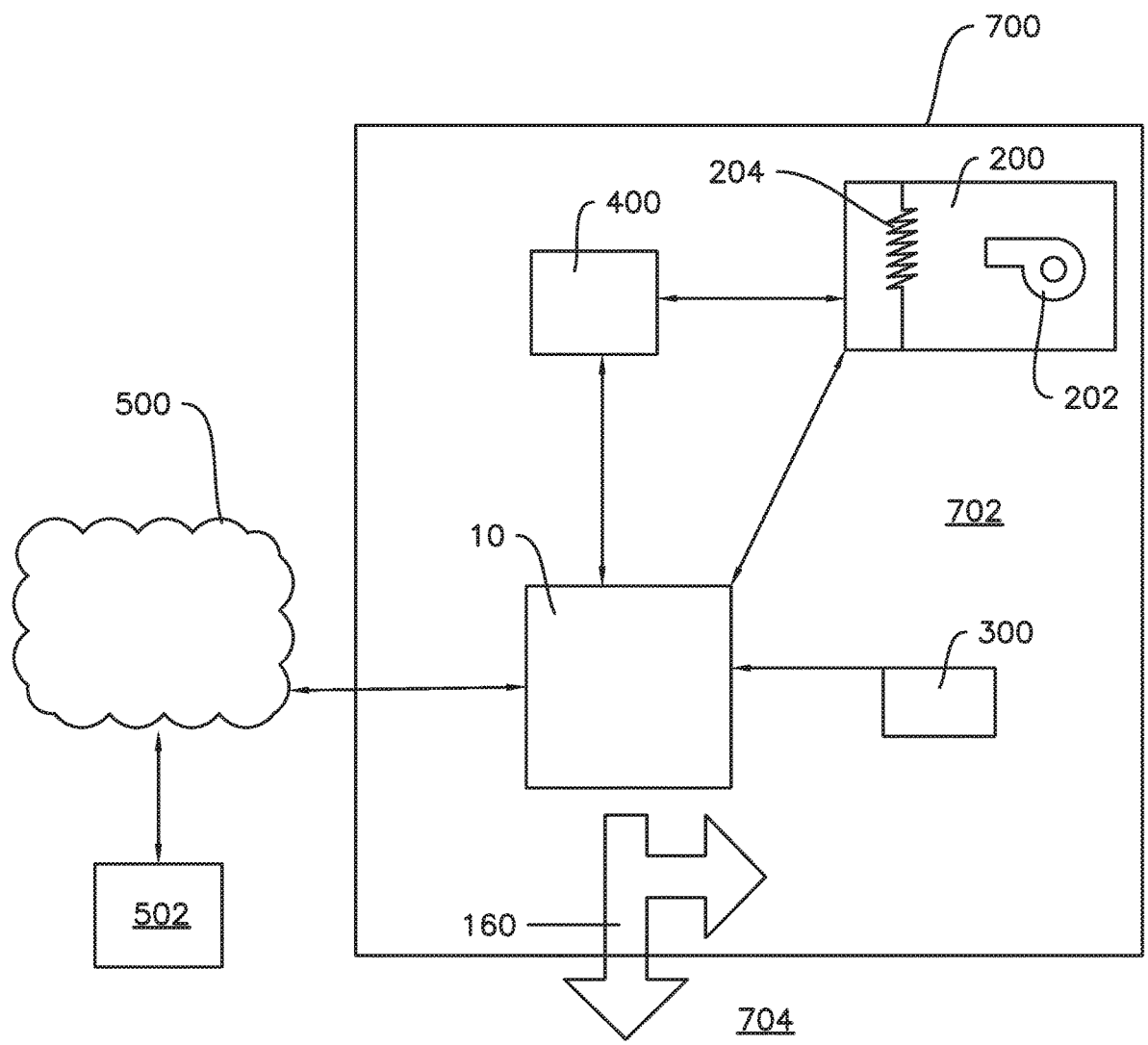
FIG. 4 provides a schematic diagram a dryer appliance in communication with various sensors and an environmental control system according to one or more embodiments of the present disclosure.

For example, as shown in FIG. 4, the dryer appliance 10 may be located within a structure 700, e.g., a residence, a laundromat, etc., and the structure 700 may define an interior space 702 within and at least partially enclosed by the structure 700, and an outdoor space 704 outside of the structure 700. The dryer appliance 10 may be configured to direct a flow of air 160 (e.g., a portion of the moisture laden, heated air drawn from drum 26, as described above) from the dryer appliance 10, e.g., from one of the ducts 41 and 44 thereof, to the interior space 702 or the outdoor space 704 in order to reduce the thermal load at the condenser 108. For example, a damper or air valve (not shown) may be provided and may be operatively connected to an actuator (not shown). The actuator may be connected to the controller 56, and the controller 56 may open, close, or otherwise adjust the position of the damper or air valve via the actuator in response to various signals and depending on the atmospheric conditions external to the dryer appliance, as described in more detail below. The structure and function of exemplary valves, dampers, and actuators are well understood by those of skill in the art, and are therefore not shown or described in further detail for the sake of clarity and concision.

As shown in FIG. 4, in various embodiments, the dryer appliance 10, in particular the controller 56, may be in communication with one or more sensors and an environmental control system 200. The sensors may be one or both of the onboard sensor 51 shown in FIG. 2 or an external sensor 300. The external sensor 300 may be located in the interior space 702, e.g., in the same room as the dryer appliance 10 or in a nearby or adjacent room, as shown in FIG. 4. In other embodiments, the external sensor 300 may also or instead be an outdoor sensor located in the outdoor space 704 outside of the interior space 702. In each embodiment, the controller 56 may be configured to receive a signal from the one or more sensors, and the signal may be indicative of an atmospheric condition external to the dryer appliance 10 measured or detected by the sensor 56 and/or 300. For example, the atmospheric condition may include one or both of temperature and humidity, and the external environment to the dryer appliance 10 for which the atmospheric condition is measured or sensed may be the interior space 702 or the outdoor space 704. As shown in FIG. 4, the controller may generally be in one-way communication with the sensor, e.g., 300, where the controller 56 receives signals from the sensor.

In additional embodiments, the controller 56 may also or instead be configured to receive a signal from a remote database 502, e.g., via a communications network 500, such as the internet or a cloud database. The signal from the remote database 502 may be indicative of an outdoor temperature and/or humidity. For example, the controller 56 may receive, via the internet, weather data including current data and/or forecasts for the outdoor temperature and/or humidity. The controller 56 may be in two-way communication with the remote database 502, such that the controller 56 may query the remote database 502 and receive the signal indicative of the atmospheric condition external to the dryer appliance 10 in response to the query.

In some embodiments, the controller 56 may be configured to communicate with a smart home system 400. For example, such communication may be two-way communication including sending and receiving data or signals to and from the smart home system 400. The smart home system 400 may be or include a smart thermostat, where the controller 56 may be configured to receive a signal indicative of an atmospheric condition external to the dryer appliance 10 from the smart thermostat and/or smart home system 400, where the atmospheric condition external to the dryer appliance 10 is an interior temperature and/or an interior humidity. The smart home system 400 may also be or include a smart hub and/or any other suitable smart home system.

The dryer appliance 10 may also be configured to send and receive signals to and from an environmental control system 200 in communication with the ambient environment around the dryer appliance 10, e.g., the interior space 702. In various embodiments, the dryer appliance 10 may communicate directly with the environmental control system 200 and/or may communicate with the environmental control system 200 via the smart home system 400 (both are illustrated in FIG. 4, which is also possible as a redundant system, although either one may be provided as a single connection as well). The controller 56 may receive signals from the environmental control system 200 which are at least indirectly indicative of an atmospheric condition external to the dryer appliance 10, e.g., temperature and/or humidity of the interior space 702. For example, such signals from the environmental control system 200 may include or be indicative of an operational status of one or more components of the environmental control system 200, e.g., an air handler 202 and/or a heater 204. Such signals may be indirectly indicative of the atmospheric condition external to the dryer appliance 10 in that the operational status of the component(s) of the environmental control system 200 may correspond to a temperature and/or humidity above or below the threshold. For example, a signal from the environmental control system 200 which indicates that the heater 204 is active may indicate that the interior temperature is below the threshold, such that directing warm air 160 to the interior space 702 may be acceptable and/or desired.

As illustrated for example in FIG. 4, the heater 204 may be an electric resistive heating element. In other examples, the heater 204 may be a gas burner or any other suitable heater.

The dryer appliance 10 may also be configured to send signals to the environmental control system 200. For example, based on the status of the dryer appliance 10, e.g., when a drying cycle is at a point where an excess thermal load may be experienced, as described above, the dryer appliance 10 may command the air handler 202 to turn on, providing additional ventilation to the ambient environment around the dryer appliance 10 and improved thermal performance of the dryer appliance 10 at times when venting is also beneficial to the surroundings, e.g., the interior space 702

Figure 5:
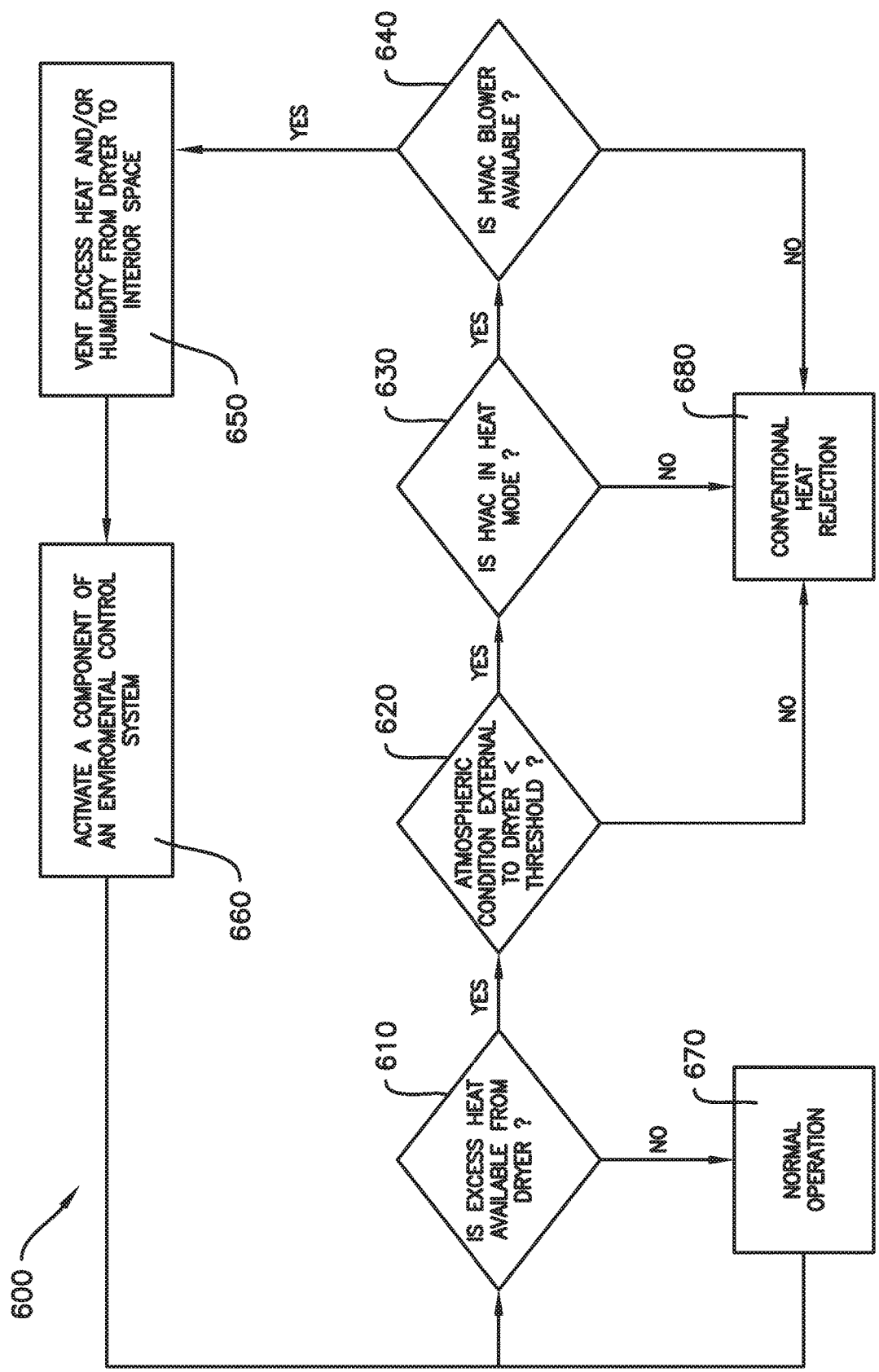
FIG. 5 provides a flow chart of an exemplary method of operating a dryer appliance according to one or more embodiments of the present disclosure.

FIG. 5 provides a flow chart of an exemplary method 600 of operating a dryer appliance according to one or more additional embodiments of the present disclosure. Method 600 may be initiated with a step 610 of determining whether excess heat is available from a dryer appliance, e.g., the dryer appliance 10 described above. When excess heat is not available, the method 600 may simply continue normal operation of the dryer appliance 10 at step 670. For example, "normal operation" may include venting or directing air from the dryer appliance 10 to an outdoor space, e.g., the outdoor space 704 illustrated in FIG. 4. When excess heat is available, the method 600 may then consider one or more additional inputs, e.g., at steps 620, 630, and/or 640, as described in more detail below, to determine whether venting to the interior space 702 is beneficial to the surroundings, e.g., the ambient environment around the dryer appliance 10, for example, the interior space 702 or a portion thereof.

In general, embodiments of the present disclosure include receiving a signal indicative of an atmospheric condition external to the dryer appliance 10, e.g., from one or more of the sensors 51 and 300, the remote database 502, the smart home system 400, and/or the environmental control system 200, as described above. The method 600 may include determining, at step 620, whether the indicated atmospheric condition external to the dryer appliance 10 is less than a threshold.

In some embodiments, the signal received at step 620 may be a signal from the environmental control system 200. When the signal from the environmental control system 200 indicates the heater 204 is active, such signal may be indicative that the atmospheric condition external to the dryer appliance 10, e.g., the temperature of the interior space 702, is less than a threshold temperature. Accordingly, the dryer appliance 10 may direct the air flow 160 to the interior space 702 at times when the heat and/or humidity of the air 160 may be desirable in the interior space 702, e.g., heat from the air 160 may serve as a supplement to or replacement for the heat provided by the heater 204 of the environmental control system 200.

As another example, in some embodiments, the signal received at step 620 may be received from an outdoor sensor 300 located in outdoor space 704 and/or from the remote database 502. In such embodiments, the atmospheric condition external to the dryer appliance 10 of which the signal is indicative may be an outdoor temperature. Thus, the dryer appliance 10 may be configured to direct the flow of air 160 to the interior space 702 during colder seasons, e.g., fall or winter, and/or during colder times of day, when the heat of the air 160 may be desirable in the interior space 702.

In various embodiments, the method 600 may consider multiple inputs, e.g., when the signal indicative of the atmospheric condition external to the dryer appliance 10 at step 620 is received from one or more of the sensors 51 and 300 and the remote database 502, the method 600 may still include receiving signals from the environmental control system 200. In such embodiments, the signals from the environmental control system 200 may be indicative of a status of the environmental control system 200, e.g., of the heater 204 and/or blower 202 thereof. For example, the method 600 may include a step 630 of determining whether the HVAC is in heat mode. The method 600 may also include a step 640 of determining whether the blower 202 of the environmental control system 200, e.g., HVAC, is available.

The method 600 may include a step 650 of venting excess heat and/or humidity from the dryer 10, e.g., via the air 160, to the interior space 702 when the indicated atmospheric condition external to the dryer appliance 10 at step 620 is less than the threshold. For example, the atmospheric condition external to the dryer appliance 10 may be an interior temperature and/or an interior humidity, and when the interior temperature and/or interior humidity is less than the threshold, the method 600 may include a step 650 of venting the air 160 to the interior space 702, whereby the air 160 may provide heat and/or humidity to the interior space 702. In at least some embodiments, e.g., where the indicated atmospheric condition external to the dryer appliance 10 at step 620 is determined from a source other than the environmental control system 200, the method 600 may proceed to step 650 only when the HVAC is in heat mode at step 630 and/or only when the HVAC blower is available at step 640. When at least one of the determinations at steps 620, 630, and/or 640 is negative, the method 600 may continue to a step 680 of conventional heat rejection, e.g., venting to the outdoor space 704.

As shown in FIG. 5, the method 600 may also include a step 660 of activating a component of the environmental control system 200 in communication with the interior space when the indicated atmospheric condition external to the dryer appliance 10 is greater than the threshold at step 620.

In at least some embodiments, the method 600 may also include performing the step 660 when the HVAC is in heat mode at step 630 and/or when the HVAC blower 202 is available at step 640. For example, the dryer appliance 10 may communicate with the environmental control system 200, e.g., either directly and/or via smart home system 400, to activate the blower 202 of the environmental control system 200 when the indoor temperature and/or indoor humidity are less than the threshold.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a dryer appliance, the dryer appliance located within an interior space defined by a structure, the method comprising:
   directing a flow of hot dry air into a chamber defined within a drum of the dryer appliance;
   receiving a signal indicative of an atmospheric condition external to the dryer appliance;
   determining that the indicated atmospheric condition external to the dryer appliance is less than a threshold;
   directing a flow of air from the chamber to the interior space after determining that the indicated atmospheric condition external to the dryer appliance is less than the threshold; and
   commanding, by the dryer appliance, a blower of an HVAC system in communication with the interior space to turn on after determining that the indicated atmospheric condition external to the dryer appliance is less than the threshold, whereby heat and humidity from the dryer appliance are distributed around the interior space.

2. The method of claim 1, wherein the signal is received from an outdoor sensor located in an outdoor space outside of the interior space.

3. The method of claim 1, wherein the signal is received from a remote database.

4. The method of claim 1, wherein the signal is received from a sensor located in the interior space.

5. The method of claim 1, wherein the signal is received from a smart home system.

6. The method of claim 1, wherein the atmospheric condition external to the dryer appliance is an outdoor temperature.

7. The method of claim 1, wherein the atmospheric condition external to the dryer appliance is a temperature of the interior space.

8. The method of claim 1, wherein the atmospheric condition external to the dryer appliance is a humidity of the interior space.

9. A method of operating a dryer appliance, the dryer appliance located in an interior space, the method comprising:
   directing a flow of hot dry air into a chamber defined within a drum of the dryer appliance;
   receiving a signal from an environmental control system separate from the dryer appliance and in communication with the interior space, the signal indicative of an atmospheric condition of the interior space;

directing a flow of air from the chamber to the interior space after receiving the signal from the environmental control system; and commanding, by the dryer appliance, an air handler of the environmental control system in communication with the interior space to turn on after receiving the signal from the environmental control system.

10. The method of claim 9, further comprising receiving a second signal indicative of an atmospheric condition of the interior space from a sensor external to the dryer appliance and located in the interior space.

11. The method of claim 9, further comprising receiving a second signal indicative of an atmospheric condition of the interior space from a sensor onboard the dryer appliance.

12. The method of claim 9, further comprising receiving a second signal indicative of an atmospheric condition of the interior space from a smart home system.

13. The method of claim 9, wherein the atmospheric condition of the interior space is a temperature of the interior space.

14. The method of claim 9, wherein the atmospheric condition of the interior space is a humidity of the interior space.

* * * * *